March 26, 1935.  J. B. WARDWELL  1,995,661
NONMALADJUSTABLE HEADLAMP INSTALLATION
Filed June 7, 1932  3 Sheets-Sheet 1
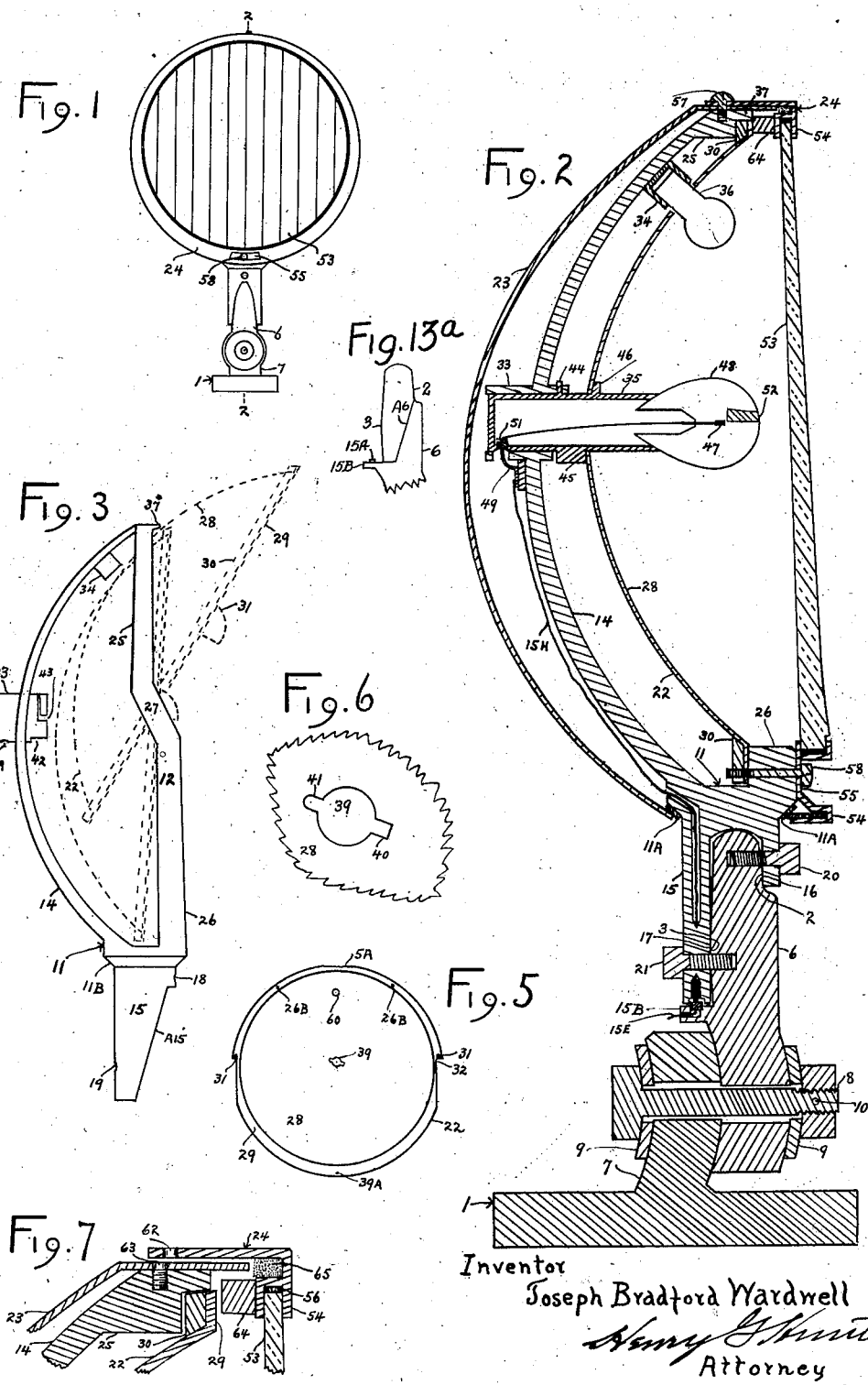
Inventor
Joseph Bradford Wardwell
Attorney

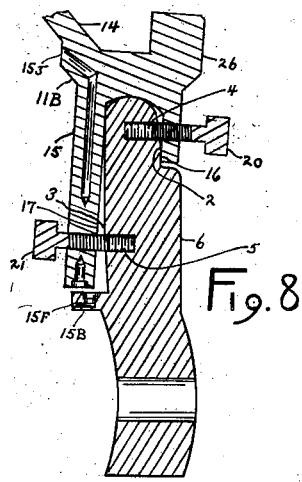

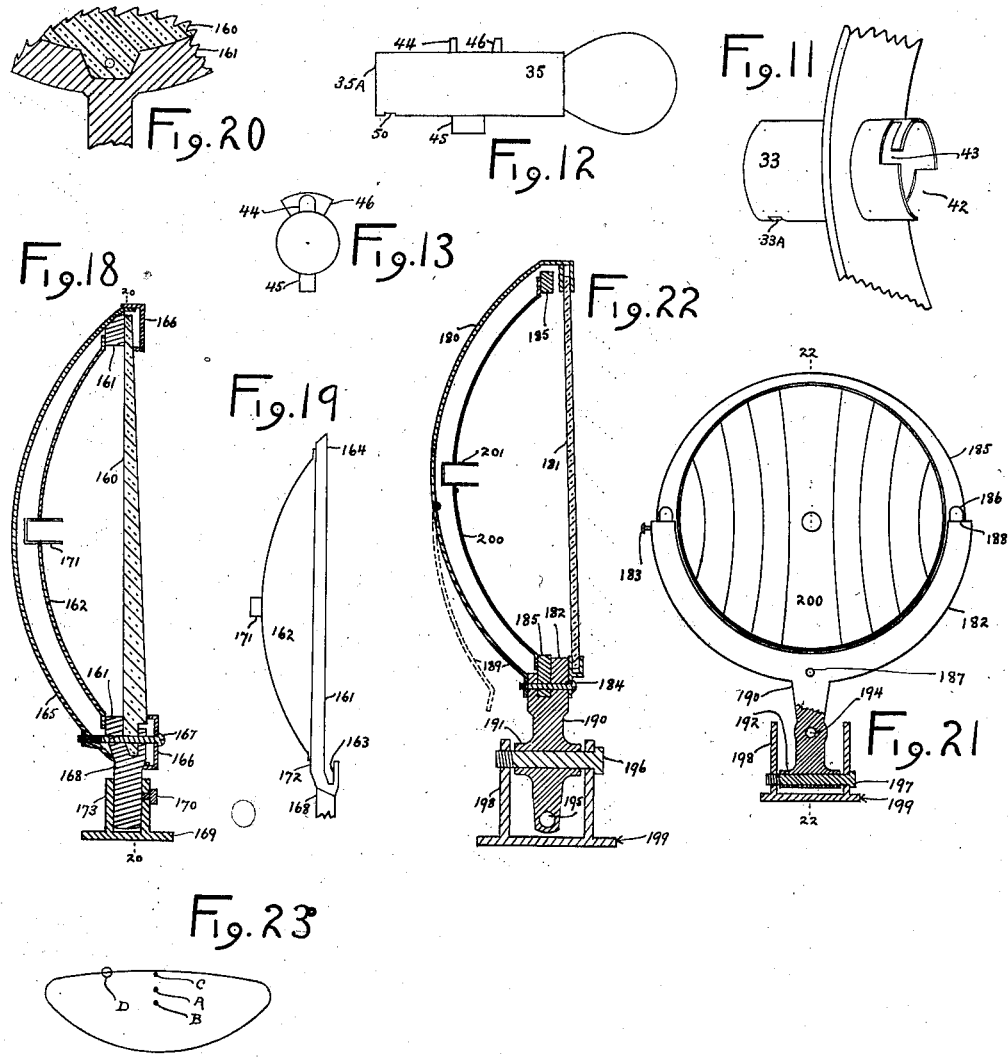

Patented Mar. 26, 1935

1,995,661

UNITED STATES PATENT OFFICE 1,995,661

NONMALADJUSTABLE HEADLAMP INSTALLATION

Joseph Bradford Wardwell, Stamford, Conn.

Application June 7, 1932, Serial No. 615,898

30 Claims. (Cl. 240—41)

My invention aims to improve the construction and operation of illuminating means and, while capable of general application for signalling and other purposes, is especially applicable for use in the headlamp installations of automotive vehicles, such as passenger cars, trucks, busses, locomotives and the like. I have therefore elected herein to disclose my invention in connection with automobiles, but without limiting its application to such use.

It is well known that automobile headlamp glare and insufficient illumination have long constituted a menace to safety and convenience on the highways at night. In the effort to control this menace, most of the States have prescribed laws and regulations which not only require all automobiles operating within their borders to be equipped with headlamp installations capable of projecting a predetermined proper pattern of light within predetermined proper limits of aiming, but also require such installations to be so adjusted that, in service upon the road, they actually do project such proper pattern within such proper limits of aiming.

An important object of these laws and regulations is to cause certain necessarily intense portions of the beam to be directed straight ahead from the vehicle at a specified vertical angle for each portion, rather than up, or aside, into the eyes of other persons on the road, thus affording adequate illumination for the man behind the headlamps, but without a blinding of others. I refer particularly to parts of the regions "B", "A" and "C" of the widely legalized pattern sponsored by the Illuminating Engineering Society, approved by American Engineering Standards Committee as tentative American standard and set forth on page 26 of Circular No. 276 of the United States Bureau of Standards, and to the vertical and horizontal angling of said parts in relation to the region "D" representing a normal location of the eyes of opposing drivers.

There have heretofore been produced so-called "adjustable" headlamp installations which, when properly adjusted by an expert with due regard for the aiming of the reflector in view of the "loading allowance" for the make and type of the particular car, for locating the source of light at the exact point contemplated by the design of the reflector, and for alignment of the light-redirecting lens, if any, can project the proper pattern of light within the proper limits of aiming. However, the experience of years has proved that a majority of these adjustable installations fail to perform their intended function in actual service upon the road, principally because, in the absence of proper means to prevent it, they lose their original correct adjustment by vibration, manipulation, wrongful assembly, ignorant tinkering, deliberate tampering, etc., whereupon they are mal-adjusted and no longer perform as intended but instead produce certain illegal glare and/or insufficient illumination results they are supposed to prevent.

These ordinary adjustable installations thus invite and produce a variety of mal-adjustments which, insofar as concerns the positioning of the primary light-redirecting means relative to the vehicle, include: the axis of the reflector being aimed above or too far below the correct vertical angle, or to the right or left of the correct horizontal angle, the vertical meridian of a lensless reflector being twisted or rocked out of vertical position or being upside down, the reflector being above or below its proper height, or the reflector being in a location combining two or more of these wrong positions. Insofar as concerns the positioning of the source of light, these mal-adjustments include: the filament being in front, in the rear, above, below, to the right or left of the limits of its intended position relative to the reflector, or in a location combining two or more of these wrong positions. Insofar as concerns the positioning of the secondary light-redirecting means, if any, these mal-adjustments include the lens being upside down or twisted out of vertical position. It is well known to those skilled in the art that very fine angles differentiate the correct from the glare-causing beam, and that a deviation of say one-hundredth of an inch at the headlamp may mean a matter of feet or yards at the point where the beam meets an oncoming vehicle, so that intense regions of the beam are directed into the eyes of approaching drivers instead of upon the road as intended. The failures flowing from the aforesaid mal-adjustments are augmented by troubles of another nature including lack of cleaning of the reflecting surface and inner surface of the glass, fingering and distortion of the reflector, bending of other parts of the installation resulting from tieing the installation to the exposed and frequently-struck front fenders, etc.

With the foregoing in mind, the principal objects of my invention in connection with automobile use may be stated in summary to be to provide a headlamp installation which corrects many serious mal-adjustments and other defects of prior devices and which, insofar as is reasonably possible (and without the necessity of technical skill and attention) insures in the actual service of ordinary motorists the intended performance of projecting a predetermined pattern of light within predetermined limits of aiming relative to the vehicle; that is, to provide an installation which exercises a positive control over the positioning of the primary light-redirecting means relative to a part of the vehicle or other base; which exercises a positive control over the positioning of the source of light relative to the primary light-redirecting means; which exercises a positive control over the positioning of the secondary light-redirecting means, if any, relative to the primary light-redirecting means and/or the source of light; which facilitates disassembly for cleaning or repairs and facilitates re-assembly with the same or replacement parts; which minimizes the liability of injuries to working parts; but which yet possesses the characteristics of practicality, strength and susceptibility to cheap, standardized production. In the accomplishing of the objects of the invention, an important factor resides in the provision of means which insure the correct relative positioning of parts by the presenting of positive barriers against the parts being put together and operated in various wrong relative positions, and which furnish the operator with a series of easily understood "signals" as to the proper location of various parts.

Special objects of the invention include the provision of a highly practical skeleton frame for positioning and supporting essential elements of the headlamp, and the provision of a simple but effective support for the skeleton frame, as is hereinafter more particularly set forth.

Another object of the invention is to provide means such that assembly of the parts to close an electrical circuit to cause the source of light to be active as an illuminant requires a location of the reflector subject to positive control of its aiming relative to the vehicle and requires a location of the source of light at an exact predetermined point relative to the reflector, whereby the mere emanation of intense reflected rays from the installation furnishes the operator with a reliable signal that the beam projected is of the correct pattern and is aimed within correct limits relative to the vehicle. This feature is particularly adaptable to the skeleton frame above mentioned, although specific features hereinafter described may be used in connection with other types of headlamps and lighting installations.

As will be hereinafter pointed out in detail, another special object of the invention is to provide means for the innocuous absorption of lost motion or clearance which promotes assembly and disassembly without binding and eliminates the necessity for various close tolerances in manufacture. Another object and advantage of the invention is in the provision of means offering protection against the glare-causing effects of distortion of the reflecting surface of the reflector. The detailed description to follow will refer to the foregoing and further objects of the invention which consists in certain novel features of construction and operation and in certain combinations of parts. This specification is a continuation in part of my former application S. N. 113,177, filed June 2, 1926, and in the accompanying drawings, which form a part hereof:

Fig. 1 is a front view of an assembled headlamp installation constructed according to my invention;

Fig. 2 is a vertical, longitudinal cross-section taken on the line 2—2 of Fig. 1;

Fig. 3 is a side elevation of the skeleton frame shown in Fig. 2, with dotted lines indicating positions of the reflector member as the latter moves along its path of travel into assembled position.

Fig. 4 is an enlarged longitudinal, vertical cross-section of the parts immediately under the screw 21 of Fig. 2, and shows these parts as they correctly approach assembled position;

Fig. 5 is a front view of the reflector member shown in Figs. 2 and 3;

Fig. 6 is an enlarged front view of the portion about the vertex of the reflector shown in Fig. 5;

Fig. 7 is an enlargement of the top portion of cross-section shown in Fig. 2, with the screw 57 removed and the tops of the reflector member and front cover approaching assembled position;

Fig. 8 is a vertical, longitudinal cross-section comparable with a portion of Fig. 2, except that the skeleton frame is angled downward upon loosening of the fastening means;

Fig. 9 is a perspective exploded view of the entire installation shown in Fig. 2, except that the front cover and fixture member are not shown;

Fig. 10 is a rear elevation of the front cover shown in Figs. 1 and 2;

Fig. 11 is an enlarged perspective view of the bulb-socket and a portion of the semi-ring shown in Figs. 2 and 9;

Fig. 12 is a side elevation of the main bulb member shown in Fig. 2;

Fig. 13 is a rear elevation of the stem of the main bulb member shown in Figs. 2 and 12;

Fig. 13a is a side elevation of the upper portion of the fixture member shown in Fig. 2.

Fig. 14 is a front view of an installation comprising another embodiment of features of the invention, with the reflector and front cover removed;

Fig. 15 is a vertical, longitudinal cross-section of the assembled installation and is taken on the line 15—15 of Fig. 14;

Fig. 16 is a vertical, longitudinal cross-section of portions of an installation comprising another embodiment of features of the invention;

Fig. 17 is a vertical, longitudinal cross-section of an installation comprising another embodiment of features of the invention;

Fig. 18 is a vertical, longitudinal cross-section of an installation comprising another embodiment of features of the invention;

Fig. 19 is a side elevation of the skeleton frame and the reflector shown in Fig. 18;

Fig. 20 is a vertical, transverse cross-section taken on the line 20—20 of Fig. 18;

Fig. 21 is a front view, partially in vertical transverse cross-section, of another embodiment of features of the invention, with the enclosing means removed;

Fig. 22 is a vertical, longitudinal cross-section of an assembled installation and is taken on the line 22—22 of Fig. 21;

Fig. 23 illustrates the outline of a preferred example of the patterns projectible by embodiments herein; and also an approximation of the outline and points "C", "A", "B" and "D" of the aforesaid widely legalized pattern set forth on page 26 of Circular No. 276 of the United States Bureau of Standards.

Referring to the embodiment shown in Figs. 1–13a of the drawings, the numeral 1 indicates generally a fixture member secured to a part of the vehicle, preferably permanently to the frame of the vehicle with no tie to the front fenders, and having the principal function of providing certain master positioning elements (comprising the positioning surfaces 2 and 3 and the holes 4 and 5 of the post portion 6 (see Figs. 2 and 8), which are located in a predetermined exact geometric relation to a part of the vehicle and which positively control the positioning and angling of the reflector support, and thereby of the reflector itself and other elements, relative to the vehicle.

The location of these master positioning elements preferably provides for the so-called "loading allowance" for the particular make and model of car, and any method may be employed to locate said elements properly. When manufacturing tolerances are sufficiently close, the master positioning elements may be on an integral fixture member secured to the vehicle (see Figs. 14, 15, 16, 17, 18 and 21); otherwise said elements are conveniently located in the correct position by the use of a fixture member having adjusting means, here illustrated in Fig. 2, wherein the aforesaid post portion 6 of the fixture member is secured for universal adjustment to the lower portion 7 of the fixture member by the bolt and nut 8 and the washers 9. It is obvious that the proper positioning of said post portion 6 having once been found may be made permanent or semi-permanent by spot-welding, or by the official sealing of a wire passed through the hole 10 in the bolt and nut, and it is also apparent that the adjusting means may be used to correct the location of the master positioning elements for changes in aiming regulations, spring-sag, the results of collisions, etc.

The installation includes a skeleton frame 11 (Figs. 2 and 3), comprising a rigid ring 12, a rigid simi-ring 14 and a tubular portion 15. The latter fits over the post portion provided the ring 12 be aimed straight ahead from the post portion or substantially so, in order to cause the inclined surfaces A15 of the tubular portion to oppose the inclined surfaces A6 of the post portion (Figs. 3 and 13a), as otherwise the enlarged part at the front of the post portion below the surface 2 and the form of the tubular portion prevent any approximation of a complete assembling approach of the tubular portion and the post portion. This complete assembling approach requires further that the skeleton frame be angled horizontally exactly straight ahead or within a small angle therefrom to permit the upwardly extending round or elongated part 15A on the rearwardly extending portion 15B of the tubular portion to enter the suitably formed space 15C in the bottom of the rear wall of the tubular portion and make a loose or close fit therein as the design may provide (see Fig. 4), as otherwise said part 15A blocks completely assembly of the parts by contacting the lower edge of said wall, (see also Fig. 2). The aforesaid part 15A may receive an electric contact element 15D, which is insulated from the general body of the installation, the latter forming an electric ground, as is customary in automotive practice, the element 15D being shown connected to the insulated wire 15E passing through the channel 15F to the unshown storage battery of the vehicle. Contacting with said element 15D, but only when the skeleton frame is placed for positive control of its angling as is referred to below, is the spring-pressed contact plunger 15G (Figs. 2 and 4), which is also insulated from the general body of the installation and which is electrically connected with the insulated wire 15H passing up through the channel 15J, which extends around the hole 19, to connect with the source of light and thereby complete an electric circuit upon proper assembly, as will hereinafter be more particularly described.

On the inside of the aforesaid tubular portion 15 are the oppositely facing positioning surfaces 16 and 17 (Figs. 2 and 8), which respectively contact the cooperating positioning surfaces 2 and 3 of the post portion 6 at the correct vertical angling of the skeleton frame relative to a part of the vehicle, and positively prevent said frame from being angled above such correct aiming as long as the positioning surfaces respectively oppose each other. The unthreaded openings 18 and 19 in the tubular portion (Fig. 3) are preferably aligned straight ahead and straight back, as are the threaded holes 4 and 5 of the post portion 6, these openings being shaped, proportioned and placed to register respectively with said holes of the post portion, for engagement of the fastening means comprising screws 20 and 21 (Figs. 2 and 8), only when the assembly of the skeleton frame and the post portion has progressed to the point that the angling and positioning of the skeleton frame relative to the post portion and a part of the vehicle is under definitely limiting control in all respects; that is, the positioning surfaces of the tubular portion respectively oppose the positioning surfaces of the post portion positively to prevent the skeleton frame from being angled above its proper aiming, and effectiveness of the fastening means to hold these two parts firmly together is accompanied by an enforced exact duplication of a predetermined positioning and angling of the reflector seat on the ring 12 relative to the post portion and a part of the vehicle, wherein the ring must be angled at the correct vertical aiming which it is barred from exceeding as above, must be angled correctly horizontally—straight ahead, must have its vertical meridian in a vertical plane, must be right side up, must be at the right height and must be at the right distance from the longitudinal axis of the vehicle. It will be noted that the parts are so constructed that they cannot be put together in any wrong way which might carelessly be mistaken for the proper way, whereby a mere putting of the parts together in the only way they will go furnishes to even an inexperienced motorist easily understood signals as to the proper relative location of parts.

It is obvious that the aforesaid inclined surfaces A15 of the tubular portion (Fig. 3) may abut the inclined surfaces A6 of the post portion (Fig. 13a) to cause said inclined surfaces, like the part 15A and the space 15C and the openings 18 and 19 and holes 4 and 5, to enter into the matter of controlling the horizontal angling, and I contemplate said inclined surfaces serving this function separately, or as supplementing the other means, particularly upon destruction as by filing of the original form of the other means.

While the positioning surfaces of the post portion and tubular portion may be of a regular form, comparable with the herein shown cylindrical surfaces 16 and 17 of the latter, and may make a close fit with each other, as illustrated in other figures herein, I prefer to construct one of the pairs of surfaces to have an irregular form and provide a slight clearance. As will be noted from Figs. 2 and 8, the upper positioning surface 2 of the post portion is formed to contact with cooperating surface 16 of the tubular portion just below the axis of the screw 20, and the lower positioning surface 3 of the post portion is formed to contact with the cooperating positioning surface 17 of the tubular portion just above the axis of the screw 21, these surfaces of the post portion being cut away slightly respectively above and below said axes. This arrangement enables me to cause either screw to hold the positioning surfaces of the post portion and tubular portion in proper contact even if the other screw be loose or missing, and I contemplate in some cases the omission of the second screw, as in other figures herein, as well as eccentric or other means for holding the positioning surfaces of the two parts in contact.

The aforesaid relation between the post portion and the tubular portion of this embodiment serves other and special purposes, namely, the provision, in an innocuous manner, of a quickly-obtained slight clearance which furnishes an extra facilitating of easy assembly and disassembly and prevents rust, contraction, expansion, etc. from interfering therewith, and also eliminates certain close manufacturing tolerances necessary with close fits. As will be noted from Fig. 8, wherein the downward angling is exaggerated for purposes of illustration, a loosening of the screws 20 and 21 permits an angling of the skeleton frame downward from its aforesaid correct aiming, but still does not permit any illegal glare-causing angling of the skeleton frame above its correct vertical aiming, as the oppositely facing positioning surfaces of the skeleton frame respectively oppose the oppositely facing positioning surfaces of the post portion to present a barrier which positively prevents the skeleton frame from "going through" its correct aiming into glare-causing angling (as is common with mal-adjustable devices). The requisite lost motion in this case is absorbed as the skeleton frame completes its assembling approach by moving into the upper limiting and correct vertical aiming. It will also be noted that the frame is positively prevented from exceeding its correct vertical angling even if solid foreign material be inserted anywhere between the positioning surfaces of the post portion and the frame, any resultant deviation from the normal vertical angling being inevitably in the less injurious downward direction.

The above-described features may well be used with various forms of supports including a skeleton frame, but I prefer and disclose herein a ring of particular form, comprising an upper portion 25 offset rearwardly from a lower portion 26 carried by the tubular portion 15. A ring of this nature may be advantageously used in connection with a light-redirecting means attached permanently, such as by riveting, to the ring, it being obvious that the construction offers a positive bar to any shift of the proper position of the means relative to the ring, such as by a forcible prying of the means away from the top or bottom of the ring, from resulting in an improper upward aiming. However, in my preferred embodiment, I employ a detachable primary light-redirecting means, or reflector, which must clearly be properly positioned and angled relative to its seat, as a proper locating of the reflector seat relative to the vehicle does not help the aiming of the reflector if the latter be improperly located relative to its seat and hence relative to the vehicle.

The ring 12 of the skeleton frame 11 positions and supports the reflector member 22 and also supports the casing 23 and front cover 24. A normal conic-sectional or other type of reflector may be employed, but I choose for many uses a preferably long-focus and hence relatively insensitive modified conic-sectional reflector having the so-called lensless characteristic that, when held right side up with its vertical meridian in a vertical plane, and accompanied by a properly focused filament, it will project the aforesaid legal pattern approximated in Fig. 23 and set forth on page 26 of the aforesaid circular No. 276 of the United States Bureau of Standards. The reflector member 22 here shown comprises the body or reflecting portion 28 and the flange 29 to which is preferably secured a stiffening-ring 30, the flange and stiffening-ring having attached to them the lugs 31 (Figs. 3, 5 and 9) and having notches 32 (Fig. 5). The semi-ring 14 reinforces the ring 12 and carries the socket 33 for the main bulb member 35 and the socket 34 for the parking bulb member 36. In the absence of the front cover 24 and of a socketing of the main and parking bulb members, and whether the casing 23 be assembled or not, the reflector member may be slid into assembled position on the ring 12 by causing it to follow the predetermined sole possible path of travel illustrated in Fig. 3, wherein the dotted lines show the reflector in two positions, first, about midway of its said travel into assembled position and, second, when it has almost completed its travel and is about to assume seated position.

When the reflector member has followed this sole possible path of travel into properly assembled or seated position, there obtains a situation as follows: the lower forwardly facing positioning surface of the flange-stiffening-ring portion contacts with the rearwardly facing positioning surface of the lower portion 26 of the ring, and the upper rearwardly facing positioning surface of the flange-stiffening-ring portion contacts with the forwardly facing positioning surface of the upper portion 25 of the ring—these contacts angle the axis of the reflector member correctly at its vertical and horizontal aiming and present a positive barrier to any angling of said axis above said vertical aiming; due to the fit of the top edge of the flattened part 5A of the flange-stiffening-ring portion (Fig. 5) just under the overhanging part 37 of the ring 12, the lugs 31 contact the shoulders 38 (Fig. 9) of the lower ring portion 26—this means that the vertical meridian of the reflector member is vertical; the reflector member is right side up, as the arrangement of the lugs above the approximate center of the reflector member prevents a seating of the member up-side down; the irregular hole 39 of the reflector member (Figs. 5 and 6) is aligned with the socket 33, the squared and rounded bays 40 and 41 being respectively opposite the apertures 42 and 43 of the socket 33 (Fig. 11)—this alone permits socketing of the main bulb member after insertion of the reflector member as is hereinafter explained, and the threaded hole 39A of the flange-stiffening-ring portion (Figs. 2 and 5) registers with the plain hole 26A of the ring 12 (Figs. 2 and 9).

It will be observed not only that this construction makes it inevitable that the reflector member is angled with meticulous accuracy when it is seated, but also that it provides a definite control over the angling of the reflector member before it arrives in seated position, most importantly during the critical period immediately preceding its seating. It is evident that the formations of the reflector member and ring 12 are such as to define a sole possible path of travel for the reflector member into properly seated position and that, during the latter part of the travel of the member along this path, the oppositely facing positioning surfaces of the reflector member respectively oppose the oppositely facing positioning surfaces of the ring 12 to present a positive barrier against any angling of the reflector member above its correct vertical aiming, and the horizontal angling of the reflector member and the angling of the vertical meridian thereof relative to a vertical plane are under definite limiting control which narrows as the member more closely approaches its seated position. It is obvious that this provides an absolute safe-guard against glare-causing upward angling of the reflector member resulting from vibration, the failure of the usually inexperienced operator to complete the assembly of the member, or secure it properly in seated position, etc. It is also apparent that the construction resembles that of the post portion 6 and the tubular portion 15 in the additional respects that it provides, in an innocuous manner as before, a quickly-obtained clearance for the extra facilitating of assembly and disassembly, that a loosening of the fastening means comprising the screws 22A permits an angling of the reflector member downward from its correct vertical angling, but that it presents a positive barrier against the member "going through" its correct vertical aiming into glare-causing angling, even if solid foreign matter be inserted anywhere between the positioning surfaces, etc. I prefer to use said screws 22A, which pass through holes 26B in the flange-stiffening-ring portion into threaded engagement with corresponding holes in the ring 12, although I contemplate in some cases the use of a spring-pressed catch effective when the reflector member has completed its travel into seated position.

It is well-known that the projection of the aforesaid correct pattern of light within the correct limits of aiming relative to the vehicle requires not only that the reflector be properly located relative to a part of the vehicle, but also that the source of light be properly located relative to the reflecting surface. While I may employ other sources of light and supports therefor in connection with the previously described features of the invention, I prefer and show herein an electric lamp having a base and socket of particular form and positioning adapted to permit the lamp to be assembled to be active as an illuminant only when the active portion thereof is located at a sole geometric point relative to its socket and to positioning surfaces controlling the location of the reflector and, if the reflector be present in the installation, only when the reflector is properly located relative to said positioning surfaces and said active portion is properly located relative to the reflecting surface. In view of the previously described construction whereby the contact plunger in the tubular member contacts with the contact element of the fixture member only upon the correct relative approach of the skeleton frame and the fixture member subjecting the frame to the aforesaid definite control of its angling, it is obvious that, when a lensless reflector and hence plain glass window are used and the parts have not been damaged, this completes a chain of absolute safe-guards against any improper operation of the apparatus, and that the mere giving of light by the main bulb member after the reflector has been inserted furnishes the operator with the unmistakable signals that the correct pattern is being projected at the correct aiming relative to the skeleton frame and, if this frame be rigidly secured to the post portion, that such correct pattern is correctly aimed relative to the vehicle itself, as is required by the regulations.

In this embodiment the electric lamp, which may be used in other apparati, comprises the main bulb member 35, which is assembled after the reflector has been properly seated, as referred to above. The locking lug 44 and the lower barrier lug 45 (Figs. 2, 12 and 13) are entered into the respective bays 41 and 40 of the irregular hole 39 in the vertex portion of the reflector member (Figs. 5 and 6), and the main bulb member is slid straight-back, the lower lug 45 guiding the locking lug 44 into the aperture 43, until the locking lug abuts the rear edge of the slotted part of said aperture, at which time the barrier lug 46 abuts the front of the reflector, as shown in Fig. 2, and the front edge of the barrier lug 45 is aligned with the rear of the reflector, it being obvious that the vertex portion of the reflector may be reinforced with a ring about the hole 39. As the filament 47 has been accurately located relative to the base 35A of the main bulb member, the filament is now located at exactly the right point along the axis of the reflector 28, and the free end of the insulated contact and holding spring 49, extending through the preferably insulated aperture 33A of the socket 33, has entered the circumferentially disposed and inclined slot 50 of the main bulb member (Figs. 2 and 12). The main bulb member is rotated clockwise until the locking lug abuts the top of the slotted part of the aperture 43 (Fig. 11), at which time the lug 45 has moved into position behind the reflector as shown in Fig. 2, and the contact and holding spring 49 completes its sliding down the aforesaid inclined slot 50 and contacts with the insulated contact button 51 of the main bulb member (Fig. 2) to close the electric circuit and cause the filament to be active as an illuminant, the general body of the installation furnishing a ground, as stated above. It will be observed that the tension of the spring 49 against the bottom of the inclined surface of the slot 50 resists any counter-clockwise motion of the bulb member due to vibration, and that energizing of the preferably monoplane filament is accompanied by the location of said filament in the desired plane.

It is obvious that this construction prevents assembly of the main bulb member and its socket to produce light unless the filament, or other active portion of the lamp, be located at exactly the one correct point relative to the socket and to the reflector positioning surfaces of the ring 12, and that, if the reflector member has been inserted improperly, or has been inserted according to the correct mode but its assembly has not been completed, the reflector member presents a barrier to assembly of the bulb member into the one position in which it is active. It will be observed that distortion of any of various parts of the reflector member will prevent the proper seating of the reflector member which alone affords assembly of the bulb member into its one active position; for example, in this embodiment, if the top of the flange and stiffening-ring portion be distorted rearwardly, or if the bottom of said portion be distorted forwardly, the distorted portion will abut its co-operating positioning surface of the ring prematurely, the aperture 39 of the reflector member being then too high for alignment with the socket 33; if either side of the aforesaid flange and stiffening-ring portion be distorted backwardly, the distorted portion will again abut the positioning surface prematurely, the aperture then being to one side of said alignment; if the reflector member be ovalled vertically, the relation of the parts of the reflector member and ring detailed in Fig. 7 operate to prevent the proper seating of the reflector member; if the reflector member be ovalled horizontally, the flange and stiffening-ring portion becomes too wide to fit between the inclined portions 27 of the ring to permit seating (see Fig. 9); and, as is hereinafter explained, in the embodiment shown in Figs. 14 and 15, the fin 117 prevents seating of the reflector member upon various distortions of the reflecting surface. It will be noted further that, if the flange-stiffening-ring portion of reflector member be properly seated against the ring 12, but the upper part of the critical portion about the vertex of the reflector body be distorted in a glare-causing manner, namely, forwardly from normal, or the lower part of said critical portion be distorted in a glare-causing manner, namely, rearwardly from normal, the barrier lugs 45 and 46 block assembly of the main bulb member into the one position in which it will give light; that these barrier lugs supplement the screws 22A in that, when the bulb member is in position to be active, the reflector member is locked in its seated position by the lugs and by the fit of the bulb member with the socket 33 and the aperture 39 of the reflector member; that the bulb member cannot be reversed into an upside down position and assembled for activity, and that this not only bears upon the locating of the filament in the desired plane as above, but also prevents an upside down location of the obturator 52 which I preferably place upon the bulb 48 to shield the bright filament from opposing eyes about to pass, thereby providing another safe-guard against the emanation from the apparatus of rays interfering dangerously with the vision of oncoming drivers. This obturator preferably has a non-reflecting surface facing the filament to avoid setting up secondary beams reflected back against the reflector, which beams would be difficult to control. The obturator may take the form of a frosted surface etched upon the glass of the bulb, or may be of opaque or translucent material adhesively secured to the latter. The obturator preferably is substantially straight along its bottom edge and arcuate along its top edge, as shown in Fig. 2. This particular shape is selected to meet several purposes, principal among which are to offer a minimum of interference with rays of light emitted from the apparatus immediately adjacent the axis of the reflector, and to cause the upper edge to conform substantialy with the arcuate line described by intersection with the glass of the bulb of a line from the filament to an opposing eye approaching from a distant point on a straight road to a place where it is about to pass to one side. If the installation includes it, the parking bulb member of the usual very low candlepower is assembled through the hole 60 of the reflector member (Fig. 5) into its socket 34 also on the semi-ring 14.

The preferably detachable casing 23 is secured to the ring 12 by any suitable means, which here include the screw 57 at the top and the round hole in the bottom of the casing through which extends the tubular member 15 (see Figs. 2 and 9), the edge of said hole in the casing compressing the ring of packing material 11A against the bevel 11B of the skeleton frame when the top of the casing is brought over the top of the ring 12. After the reflector member has been seated and the main and parking bulb members have been socketed, the front cover 24 is assembled to close the headlamp. One form of front cover comprises the frame 54, into which fits the window 53, the latter being preferably a secondary light-redirecting element or lens when the reflector 28 is of normal conic-sectional conformation, and a plain glass when the reflector is of the lenseless type mentioned above. The ring of packing 56 contacts the edge of the window which fits over the inwardly extending panel 55 upon proper alignment. The front cover is aligned and held in assembled position by the screws 57 and 58, the latter of which passes through the plain hole 59 of the front cover and the plain hole 26A of the ring 12 (Fig. 9) into threaded engagement with the hole 39A of the reflector flange and stiffening ring (Fig. 5). When the plain hole 62 at the top of the front cover registers with the threaded hole 63 at the top of the ring 12 (Fig. 7) for engagement of the aforesaid screw 57, and the aforesaid hole 59 registers with the hole 26A of the ring for entry of the screw 58, the lug 64 on the inside of the front cover abuts the flange 29 of the seated reflector.

It will be obvious from Fig. 2 that, if desired, the securing of the lower part of the front cover may be made by engagement of the screw 58 with the reflector member, this also tending to hold the reflector member firmly against the ring, the lug 64 and the screw 58 in this instance supplementing the aforesaid screws 22A and the lugs 45 and 46, but I contemplate securing the front cover to the ring or casing independently of the reflector member, preferably then threading the screw 58 into the hole 26A. Fragmentary Fig. 7 shows portions of all of the parts at the top of the headlamp, except the screw 57, the casing being in proper place and the front cover and reflector member closely approaching assembled position, these parts being shown in this position for convenience of illustration, such positioning being possible for the reflector member only when the main bulb member and parking light member have not been socketed. The packing ring 65 (Fig. 7) extends around between the inner surface of the frame 54 and the front edge of the casing to complete the sealing of the headlamp against weather, dust, etc.

It will be noted that the formation and positioning of the parts are such that the front cover and casing cannot unite or make a close relative approach to their assembled positions, over the reflector member and its seat on the ring 12, unless the reflector member has been inserted according to the correct mode, has been moved along its aforesaid sole possible travel into assembled position, and unless the travel has been completed by the member being properly seated. That is to say, the parts are formed, proportioned and placed so that an improper positioning of the reflector member behind the semi-ring blocks the aforesaid assembling approach of the casing and front cover; if the flange-stiffening-ring portion of the reflector member be improperly placed wholly in front of the ring 12, said assembling approach of the casing and front cover is blocked by the lug 64 and the lugs 31 and the lower part of the flange-stiffening-ring portion itself; said assembling approach is barred by insertion of the reflector according to the correct mode except that it is upside down because, as is explained above, the arrangement of the lugs 31 prevents seating the reflector member upside down; and said assembling approach is blocked if the reflector member be moved according to the correct mode but not all the way into seated position, as then the lug 64 interferes and prevents registry of the holes for engagement of the screws. It will thus be observed that, if the enclosing means be assembled over the reflector member and its seat, a definite and easily understandable signal is furnished the operator that there has been exactly duplicated the predetermined proper positioning and angling of the reflector member relative to its seat, i. e., it is angled at the correct vertical and horizontal aiming, its vertical meridian is properly located, it is right side up, it is at the right height, etc.

Fig. 8 illustrates particularly an important feature of the invention which relates to the arrangement by which I obtain the great advantages of the skeleton frame and at the same time eliminate the disadvantages of other general types. My design avoids the defects of the flexible ring type (wherein the glass, reflector flange and casing are bound together at their peripheries by the ring) and also avoids the defects of the ordinary rigid ring type (wherein also the glass is seated against the ring and the reflector is seated against the glass). Aside from other important considerations (such as the easily fracturable glass entering into the matter of the aiming of the reflector), both of these ordinary types present the serious defects that the amount of work requisite to getting at the reflecting surface and the inner surface of the glass discourages the frequent cleaning necessary to adequate illumination for safe driving; and that the handling of the ordinarily thin reflector increases the liability of denting, as well as impairment of the reflecting surface by finger-marking, etc. These material advantages are in addition to the obvious ones in connection with providing a structure whereby the positioning, angling and support of the light-redirecting means is done directly by a rigid skeleton frame extending to a part of the vehicle and preferably the frame thereof, thereby among other things avoiding reliance on the shell, which can thus be even thinner, and on the glass, as contrasted with providing a structure whereby the usually thin and hence easily distortable shell and/or the easily fracturable glass, is or are caused to enter into the important matter of the positioning and angling of the light-redirecting means relative to the vehicle.

It will be noted from the foregoing that, without any disturbance of the secured operating position of the reflector member on the ring 12 or of the secured operating position of the ring 12 relative to the vehicle, the front cover may be moved from assembled position for cleaning of the reflecting surface and inner surface of the glass, and/or for relamping, and that without such disturbance, the casing may be moved from assembled position by dropping it back to afford access, such as for repair, to the rear of the interior of the headlamp, where wiring is conveniently located. It will be obvious to those skilled in the art that these features also contribute materially to the greatly increased efficiency of the installations under conditions of actual use by the average motorist.

Another embodiment of features of the invention is shown in Figs. 14 and 15, wherein the integral fixture member 100 which contemplates the close manufacturing tolerances referred to above, includes the plain curved surface post portion 101, the positioning buttress 102, and the threaded hole 103. This fixture member is attached to a part of the vehicle, preferably permanently and to the frame thereof but, like the other embodiments, it may be attached to a part of the vehicle having restricted motion relative to the frame, such for example as a part moving horizontally with the front wheels. The tubular member 104 carries the headlamp assembly and fits closely over the post portion 101, the plain hole 105 of the tubular member registering with said hole 103 of the fixture member, for engagement of an unshown screw like the screw 146 of Fig. 17, only after the tubular member has been properly placed over the post portion and has been brought down to an extent causing said positioning buttress 102 to engage the closely fitting slot 106 of the tubular member, the height of the buttress being greater than the distance of the threaded hole 103 from the top of the post portion. It is obvious that the functions of said screw may be served by a spring-pressed catch effective when the tubular member completes its travel into assembled position, and that this construction, like that of Figs. 1–13a, provides a positive barrier to assembly of the parts to secure the tubular portion rigidly to the post portion to aim the ring 107 substantially straight ahead from the fixture member, except to produce an exact duplication of a predetermined correct angling of the vertical meridian of the ring relative to all planes through the fixture member, so that, as in the previous case, operation of the fastening means to hold the post and tubular portions rigidly together, with the ring aimed about straight ahead, indicates to the operator that the oppositely facing surfaces and other positioning elements of the reflector seat are positioned and angled to meticulous accuracy relative to the vehicle.

Solidly connected with the tubular member 104 is the rigid ring 107, which presents an upper portion 108 offset rearwardly from a lower portion 109, these portions, as in the previous embodiment, presenting respectively an upper forwardly facing positioning surface and a lower rearwardly facing positioning surface, these surfaces being adapted to be contacted by the oppositely facing positioning surfaces of the flange 110 of the reflector member 111 at the proper vertical and horizontal angling of the axis thereof. Extending upwardly from the lower portion 109 of the ring is the arm 112, which is enlarged at its top to form a socket 115 for the bulb 116, and which may conveniently contain a hole or channel (unshown) for an insulated wire running to said socket. This arm has a rearwardly extending fin 117 of which the lower edge conforms with the shape of the opposing portion of the working surface of the reflector, for a purpose to be described. The rear of the headlamp is closed by the portion 118, which is here shown as permanently attached to the ring 107 and which, insofar as concerns closing the headlamp and reinforcing the ring, is comparable with the casing and semi-ring of the embodiment shown in Figs. 1–13a. The reflector member is inserted in a manner illustrated in Fig. 3, as it follows a similar path of travel into seated position, wherein the oppositely facing positioning surfaces of the reflector flange 110 respectively contact the oppositely facing positioning surfaces of the supporting ring and unshown lugs on the reflector flange (like the lugs 31 of Figs. 3 and 9) contact the shoulders 119 of the ring, the reflector being secured in seated position by unshown screws like the screws 22A of Fig. 9 or by any other suitable means.

The front of the headlamp assembly is closed by a cover 120, which is secured to the support 114 in any appropriate manner, such as a screw at the bottom and a screw or lug extending down from the cover at the top (see the screw 57 of Fig. 2). Fig. 15 shows the reflector member approaching seated position and also shows clearly a feature of the embodiment disclosed in Figs. 1–13a, i. e., when the reflector member has once been assembled according to the proper mode, application of the cover cages the reflector member subject to the limiting control of its angling by the location of the positioning surfaces of the reflector member and its seat respectively oppositely each other, regardless of the omission by election or otherwise of means (like the screws 22A of Fig. 9, the screw 58 and the lugs 45, 46 and 64 of Fig. 2) for holding the reflector member snugly against the ring, and regardless of the ineffectiveness of such means if present.

When the reflector member is of original form and is seated in proper position against the ring 107, a portion of the reflecting surface at or near the vertical meridian contacts or almost contacts the aforesaid lower edge of the fin 117, but if the lower part of the reflector member has been distorted upwardly and forwardly, said lower edge of the fin prevents the reflector member from being assembled into a position wherein the top portion would be properly seated and the lower and distorted portion would be aimed above its normal and correct angling and would therefore project illegal glare-causing rays. It will thus be observed that this construction, like that about the vertex of the reflector member shown in Figs. 1–13a, provides a measure of protection against the practice of distorting the reflector to cause intense rays to be angled above the proper aiming.

While I generally prefer a vertical disposition of the positioning surfaces controlling the vertical angling, these may be located in other planes, as is illustrated in Fig. 16, wherein the positioning surfaces on the upper portion 130 of the fixture member 131 are set an at angle of about 45 degrees, as are the cooperating oppositely facing positioning surfaces of the supporting member 132, and the upper positioning surfaces on the latter and the cooperating oppositely facing positioning surfaces associated through the arm 133 with the reflector supporting ring 134 are set about horizontally, as shown in dotted lines. The downwardly extending round, oval or square cross-sectioned portion of the supporting member 132 must be properly positioned and angled in all respects in the tubular upper portion 130 of the fixture member when an unshown screw (comparable with the screws 20 and 21 of Fig. 2) extends through the plain hole 135 of the upper portion 130 into threaded engagement with the corresponding hole in the member 132, and is effective to hold the parts rigidly together. The positioning surfaces of the supporting member 132 and of the arm 133 are kept in contact by any suitable means, preferably by screws tending to force these surfaces toward each other. The bulb socket 136 is here shown as carried by the reflector 137, which is preferably attached permanently to the plain ring 134. In this embodiment it will be noted, among other things, that it is impossible to operate the aforesaid unshown screw to secure the supporting member 132 rigidly to the fixture member 131 except to produce an exact duplication of the predetermined positioning and angling of the supporting member relative to the fixture member and hence to the part of the vehicle to which the fixture member is attached.

Fig. 17 shows another embodiment of the invention, which is particularly adapted for cheap manufacture and in which the fixture member 140 includes a tubular portion 141, into which snugly fits the post portion 142 of the skeleton frame 143, the latter including a plain ring portion 144 to which the reflector 145 is attached, preferably in a permanent manner, such as by soldering, or by electrical deposition to secure an exact positioning of the reflector relative to the ring portion. The screw 146 extends through a plain hole in the front wall of the tubular portion 141 into threaded engagement with the unnumbered hole in the post portion 142, these holes being proportioned and placed to align for engagement of the screw when the ring 144 is aimed exactly straightahead. The headlamp assembly is closed at the rear by the casing 147, which has an inturned flange 148 abutting the rear surface of the plain ring 144, and the front cover 149, which includes the plain glass or lens window 152 and abuts the front surface of the ring 144, packing rings (unshown) being insertible in these joints to seal the headlamp. The screws 150 and 151 conveniently extend through the plain holes in the front cover and ring 144 into threaded engagement with said flange 148 of the casing to hold the front cover and casing in assembled position.

Another embodiment of the invention is shown in Figs. 18, 19 and 20, wherein the front lens is the light-redirecting element 160 of which the positioning and angling is controlled by oppositely facing positioning surfaces on the ring 161. The reflector 162, which may carry the bulb socket 171, is secured, preferably in a permanent manner, to the rear of the ring, and the lens 160 fits into place only in the position shown in Figs. 18 and 20, any angling of the lens above its normal aiming being blocked by the barrier formed by the oppositely facing positioning surfaces 163 and 164 (Fig. 19). The casing 165 and the front cover 166 enclose the headlamp and are secured at the top in any suitable manner and at the bottom by the screw 167 making threaded engagement with the casing as shown. It will be noted that the formation, proportioning and positioning of the parts are such that the front cover and casing cannot unite or make a close relative approach to their assembled positions over the light-redirecting means and its seat, unless the lens be placed for proper assembly, that is, with its vertical angling definitely limited by the positioning surfaces as aforesaid, and with its lip at the bottom inserted in the aperture in the ring which it fits as shown in Figs. 18 and 20. The square or other non-cylindrical post portion 168 of the skeleton frame 172 makes a close fit with the tubular portion 173 of the fixture member 169, the screw 170 threaded into a wall of the tubular portion being adapted to abut the post portion.

Figs. 21 and 22 show another embodiment of features of the invention wherein the casing 180 carries the window 181 to form a unitary enclosing member secured to the semi-ring 182 by the screws 183 threaded into the tops of the branches of the semi-ring and by the screw 184 at the bottom, which last screw passes through the plain holes in the front cover portion, the semi-ring and the reflector ring 185 into threaded engagement with the flange on the casing 180 as shown. It is obvious that the relation between the parts is such that the enclosing member or means cannot be assembled over the reflector 200, the reflector ring and the semi-ring unless the reflector ring be placed subject to the control of its vertical and horizontal angling by the oppositely facing positioning surfaces of the closely fitting reflector ring and semi-ring, and it is also obvious that the hole in the bottom of the reflector ring will not register with the hole 187 of the semi-ring for passage of the screw 184 until the lugs 186 on the reflector ring are in proper position resting upon the shoulders 188 formed by the tops of the branches of the semi-ring. It will thus be observed that assembling the enclosing means over the reflector member and its seat signals the duplication of a predetermined positioning and angling of the reflector ring relative to the semi-ring. The enclosing member has a preferably hinged portion 189 extending across its rear in or near a horizontal plane through its center and movable as shown in dotted lines in Fig. 22 into a position to permit removal of the enclosing member, by drawing it upwardly from over the seated reflector, and thereby afford access to all parts of the interior of the headlamp without disturbing the operating position of the reflector relative to the semi-ring and without disturbing the position of the latter relative to the vehicle.

The semi-ring terminates in a portion 190 having elongated parts 191 and 192 at right angles to each other and provided with plain holes 194 and 195 through which pass the snugly fitting bolts 196 and 197 to secure said portion 190 to the walls 198 of the fixture member 199, one end of each of said bolts being threaded into one of said walls, as shown. It will be observed that it is impossible to operate these bolts to secure said portion 190 firmly to the fixture member, with the semi-ring and mounted reflector aimed about straightahead or even forwardly, except to duplicate exactly a predetermined positioning and angling of the semi-ring and seated reflector relative to the fixture member and hence to the part of the vehicle to which the fixture member is preferably permanently attached. The reflector 200 here shown carries the bulb socket 201 and is a so-called lensless one, being formed of a plurality of conic-sectional surfaces and projecting the aforesaid pattern approximated in Fig. 23 and set forth on page 26 of the aforesaid Circular No. 276 of the United States Bureau of Standards, and thereby permitting the use of plain glass for the window.

I prefer to accomplish the objects of the invention by devices and means shown and described herein, but it is evident that the same may be varied and individual features of the several illustrative arrangements in the drawings may be adapted to various constructions of headlamps and interchanged on the embodiments shown and described herein.

I claim:

1. A headlamp having, in combination, a reflector having upper and lower peripheral portions radially disposed relative to the axis thereof, a support having a forwardly facing surface above said axis forming a seat for the upper of said peripheral portions and having a rearwardly facing surface below said axis forming a seat for the lower of said peripheral portions.

2. A vehicle headlamp installation having, in combination, a reflector, a member carrying said reflector, a fixture portion carried by the vehicle, said member having an upper positioning surface facing in one direction and a lower positioning surface facing in the opposite direction, said fixture portion having oppositely facing positioning surfaces adapted to contact respectively with said surfaces of said member, and securing means to force said surfaces of said member and fixture portion toward each other.

3. A vehicle headlamp installation having, in combination, a reflector, a member carrying said reflector, a fixture portion carried by the vehicle, said member adapted to be detachably secured to said fixture portion by fastening means, said member and fixture portion having cooperating portions presenting oppositely facing upper and lower parts for causing tightening of said fastening means to aim said reflector at a predetermined vertical angle relative to a horizontal plane and for causing lost motion, consequent to loosening of said fastening means and affecting the vertical angling of said reflector, to aim said reflector downward from said predetermined vertical angle.

4. A headlamp installation having, in combination, a reflector having upper and lower portions radially disposed relative to the axis thereof, a support for the reflector having a forwardly facing surface above said axis forming a seat for the upper of said peripheral portions and having a rearwardly facing surface below said axis forming a seat for the lower of said peripheral portions, means for attaching said support to a vehicle comprising a fixture portion carried by the latter, fastening means for securing said support to said fixture portion, said support and fixture portion having cooperating portions for causing tightening of said fastening means to aim said reflector at a predetermined angle relative to a horizontal plane and for causing lost motion, consequent to loosening of said fastening means and affecting the vertical angling of said reflector, to aim said reflector downward from said predetermined angle.

5. In a vehicle headlamp installation, the combination of a fixture on the vehicle, a casing, a closure, a reflector, a mounting, said mounting including a ring portion to support said reflector in operating position and to support said casing and closure independently of said reflector, a reinforcing member joining portions of the periphery of said ring portion, means comprising fastening elements for securing said mounting rigidly to said fixture to enforce an exact predetermined vertical and horizontal angling of the axis of said ring portion and reflector in a direction substantially straight ahead from said fixture, an electrical circuit, a detachable incandescent electric lamp, a support for said lamp carried by said reinforcing member, means dependent upon a predetermined exact positioning of said mounting relative to said fixture and of said lamp relative to said reflector to close said circuit to energize said lamp, said casing and closure being movable from assembled position to permit access to the working and reverse surfaces of the reflector without disturbing the operating position of the reflector on the mounting, without disturbing the operating position of the mounting on the vehicle, and without a lamp-deenergizing breaking of said circuit.

6. In a vehicle headlamp installation, the combination of a fixture portion on the vehicle, a frame-like mounting including a rigid ring portion, a casing enclosing the rear of the headlamp, fastening means independent of the casing for detachably securing said mounting to said fixture portion in operating position, a reflector, a closure for the front of the headlamp including a glass assembled independently of the reflector, said glass being spaced forward from said ring portion, means independent of the casing and closure for rigidly holding said reflector to said ring portion in operating position, and means independent of said reflector holding means and reflector for securing said casing to said ring portion, said closure and casing being movable from assembled position without affecting the operating position of said reflector, of said reflector holding means and of said means for fastening said mounting to said fixture portion.

7. A vehicle headlamp installation having, in combination, a fixture member on the vehicle, a detachable mounting, a reflector secured to said mounting, and means for securing said mounting rigidly to said fixture member to enforce an exact predetermined vertical and horizontal angling of a meridian of said mounting and reflector in a direction substantially straight ahead from said fixture member, said means comprising a part on said mounting and a portion of said fixture member and elements for holding said part and portion together, said means adapted to bar association thereof to secure said part rigidly to said fixture portion to afford any other substantially straight ahead angling of said meridian, an electrical contact mounted on said fixture member, and another electrical contact carried by said mounting, said contacts being engageable, with said mounting aimed substantially straight ahead from said fixture portion, only upon a relative positioning of said mounting and fixture portion to permit said means to be operable to enforce said predetermined vertical and horizontal angling of said meridian.

8. In an illuminating apparatus, the combination of a casing, a window, a mounting having relatively upper and lower oppositely facing positioning surfaces in fixed relation to each other within said casing, a detachable reflector unit having relatively upper and lower oppositely facing positioning surfaces in fixed relation to the reflecting surface, said positioning surfaces of said unit being adapted to be moved into position causing them respectively to oppose said positioning surfaces of said mounting to present a positive barrier against any angling of said unit above a predetermined normal operating vertical angling determined by said surfaces of said unit respectively contacting said surfaces of said mounting, and means to block assembly of said casing and window to enclose said unit and said surfaces of said mounting, except upon said movement of said surfaces of said unit into said position causing them to respectively oppose said positioning surfaces of said mounting.

9. In a vehicle headlamp installation, the combination of a fixture portion on the vehicle, a mounting associated with said fixture portion and presenting upper and lower relatively oppositely facing positioning surfaces in fixed relation to each other, a detachable reflector unit having upper and lower relatively oppositely facing positioning surfaces in fixed relation to the reflecting surface, means for enclosing said reflector, said positioning surfaces of said unit being adapted, upon assembling approach of said unit and mounting, to move into respective contact with said positioning surfaces of said mounting to align said unit at a predetermined vertical operating angling independently of said enclosing means.

10. In a vehicle headlamp installation, the combination of a fixture portion on the vehicle, a mounting associated with said fixture portion and presenting upper and lower relatively oppositely facing positioning surfaces in rigidly fixed relation to each other, a detachable reflector unit having upper and lower relatively oppositely facing positioning surfaces in rigidly fixed relation to the reflecting surface, said positioning surfaces of said unit being adapted, upon assembling approach of said unit and mounting, to be moved into position causing them respectively to oppose said surfaces of said mounting to bar an aiming of the axis of said reflecting surface above a predetermined normal operating angle of elevation defined by said surfaces of said unit respectively contacting said surfaces of said mounting.

11. The structure of claim 10, including means on said unit and mounting adapted, upon said assembling approach of said unit and mounting, to cooperate with said positioning surfaces of said unit and mounting to locate the vertical meridian of said reflecting surface parallel to a predetermined plane through said mounting.

12. A vehicle headlamp apparatus having, in combination, a detachable reflector unit having oppositely facing positioning surfaces in rigidly fixed relation to the reflecting surface, a mounting having oppositely facing positioning surfaces in rigidly fixed relation to each other, said surfaces of said unit being adapted, upon assembling approach of said unit and mounting, to be moved into position causing them respectively to oppose said surfaces of said mounting to bar an aiming of the axis of said reflecting surface above a predetermined normal operating angle of elevation defined by said surfaces of said unit respectively contacting said surfaces of said mounting, and fastening means for holding said surfaces of said unit and mounting in contact, said fastening means including elements registering for engagement upon said movement of said surfaces of said unit into said position to respectively oppose said surfaces of said mounting.

13. A vehicle headlamp installation having, in combination, a fixture portion on the vehicle, a frame-like mounting carried by said fixture portion and having oppositely facing positioning surfaces, a detachable reflector unit having oppositely facing positioning surfaces adapted to be seated against said surfaces of said mounting, a reinforcing member forming part of said mounting, a socket and a contact and holding element carried by said reinforcing member in spaced relation with said positioning surfaces of said mounting, a lamp, an electrical circuit for energizing said lamp, a base on said lamp adapted to be oriented for insertion in said socket through an irregularly shaped aperture in said reflector unit but only upon proper seating of said surfaces of said unit against said surfaces of said mounting, means on said mounting and unit preventing said seating of said reflector unit except with its vertical meridian in a vertical plane and with a predetermined point uppermost, a contact element on said base, means on said base adapted to contact with a portion of said aperture to guide said contact element of said base into a predetermined position relative to said socket and said contact and holding element, means on said base and socket affording limited rotation of said base in one direction from said predetermined position to cause said contact element to engage said contact and holding element to close said electrical circuit to energize said lamp in a predetermined sole position relative to said seated reflector and said positioning surfaces of said mounting, said contact element being arranged to cooperate with said contact and holding element to resist rotation of said base in the opposite direction, means including said guiding means effective upon distortion of the reflecting surface of said unit to prevent assembly of said base through said aperture into said position affording engagement of said contact element and said contact and holding element, a light-redirecting element adapted to cooperate with said reflector unit, and means for holding said light-redirecting element in assembled position to be supported by said mounting, said last named means including elements adapted to register only upon a predetermined alignment of said light-redirecting element with said surfaces of said mounting.

14. A vehicle headlighting installation having, in combination, a fixture portion on the vehicle, a mounting comprising a rigid skeleton having a ring portion and a member for attachment to said fixture portion, a reflector, means holding said reflector in operating position against said ring portion, means comprising fastening elements for securing said member rigidly to said fixture portion to enforce an exact predetermined vertical and horizontal angling of a meridian of said ring portion and reflector in a direction substantially straightahead from said fixture portion, said member, fixture portion and fastening elements adapted to bar association thereof to secure said member rigidly to said fixture portion to afford any other angling of said ring portion and secured reflector in a direction substantially straightahead from said fixture portion, a light-redirecting lens, and means for securing said lens in position to cooperate with said reflector, said securing means including elements adapted to register only upon a predetermined alignment of said lens with said ring portion.

15. The structure of claim 2, including a lamp, an electrical circuit, and means in respectively spaced relation with said positioning surfaces of said member and fixture portion to close said circuit to energize said lamp.

16. In a vehicle headlighting installation, the combination of a fixture on the vehicle, a reflector, a casing and closure comprising a housing having an aperture, a rigid frame-like mounting having a ring portion to position and support said reflector and to detachably support said housing independently of said reflector, a member on said mounting adapted to extend through said aperture for attachment to said fixture, and packing means surrounding said aperture to seal said housing.

17. A headlamp having, in combination, a mounting presenting relatively upper and lower oppositely facing positioning surfaces, a reflector member having relatively oppositely facing positioning surfaces adapted to be respectively seated against said first surfaces to align said member relative to a plane through said mounting, and means effective upon distortion of a portion of said member to prevent said seating of said member.

18. A headlamp having, in combination, a mounting, a reflector member adapted to be assembled in operating position on said mounting and means effective upon distortion of a portion of the reflecting surface of said member to bar movement of said member into said position, said means comprising a part presenting an edge opposing said portion of the reflecting surface and conforming substantially with the curvature thereof.

19. A vehicle headlamp installation having, in combination, a fixture on the vehicle, a rigid frame-like mounting carried by said fixture, a reflector carried by said mounting and having an aperture adjacent its vertex, a rigid reinforcing member extending behind said reflector and joining portions of the periphery of said mounting, and a lamp having a base portion extending through said aperture and interengaging a part of said member.

20. The structure of claim 19 including an electrical circuit, and contact elements respectively on said lamp base portion and member part to close said circuit to energize said lamp only upon a predetermined exact positioning of said lamp relative to said mounting.

21. In an illuminating apparatus, the combination of a mounting having relatively upper and lower oppositely facing positioning surfaces, a reflector having relatively oppositely facing surfaces adapted to contact said first surfaces at a predetermined angling of said reflector relative to a plane through said mounting, a socket and a contact element in spaced relation with said surfaces of said mounting, a lamp, an electrical circuit for energizing said lamp, a base on said lamp adapted for insertion in said socket, a contact member on said base, and means on said base and socket affording limited movement of said base in said socket to cause said contact member to engage said contact element to close said circuit upon a predetermined location of said lamp relative to said oppositely facing positioning surfaces of said mounting.

22. In a vehicle headlighting installation, the combination of a reflector, a lamp, an electrical circuit, and means for supporting said reflector and lamp and for notifying an operator that the beam projected by said reflector is of a predetermined pattern and at a predetermined angling relative to the vehicle, said means comprising a fixture member on the vehicle, a detachable mounting carrying said reflector, means for securing said mounting to said fixture member, said fixture member, mounting and securing means assembleable only to enforce an exact predetermined vertical and horizontal angling of said mounting and reflector relative to said fixture member, said first named means also comprising elements contactible to close said circuit to energize said lamp only upon a predetermined exact positioning of said lamp relative to said reflector.

23. A vehicle headlamp installation having, in combination, a reflector, a member carrying said reflector, a fixture portion on the vehicle, said member having an upper positioning surface facing in one direction and a lower positioning surface facing in the opposite direction, said fixture portion having oppositely facing positioning surfaces adapted to be contacted respectively by said surfaces of said member at a predetermined vertical angling of said member, means on said member and fixture portion adapted to cooperate to limit the horizontal angling of said member, and securing means forcing said surfaces toward each other, said securing means comprising elements adapted to register, with said member aimed substantially straightahead from a part of said fixture portion, only upon a relative approach of said member and fixture portion causing said limiting means to be in position to cooperate and causing said surfaces respectively to oppose each other to bar any aiming of said member above said vertical angling.

24. A vehicle headlighting installation having, in combination, a fixture portion on the vehicle, a mounting comprising a rigid skeleton having a ring portion and a member for attachment to said fixture portion, a reflector, means holding said reflector in operating position against said ring portion, and means comprising fastening elements for securing said member rigidly to said fixture portion at a predetermined operating level to enforce an exact predetermined vertical and horizontal angling of the axis of said ring portion and reflector in a direction substantially straight ahead from said fixture portion, said member, fixture portion and fastening elements being adapted to bar association of any part thereof to secure said member rigidly to said fixture portion at any other level to afford any angling of said ring portion and secured reflector in a direction substantially straight ahead from said fixture portion.

25. In a vehicle headlighting installation, the combination of a fixture member on the vehicle, a mounting, a reflector, a casing, means for detachably securing said mounting to said fixture member in operating position independently of said casing, said mounting comprising a rigid skeleton including a ring portion positioning and supporting said reflector, a closure comprising a rim and a lens to cooperate with said reflector, said casing and closure being adapted to unite to close the headlamp, over said ring portion, reflector and lens, only upon a predetermined alignment of said lens with said mounting, and means for holding said closure in assembled position independently of said reflector.

26. A vehicle headlamp installation having, in combination, a fixture portion on the vehicle, a mounting carried by said fixture portion and having relatively upper and lower oppositely facing positioning surfaces, a detachable reflector unit having oppositely facing positioning surfaces adapted to be respectively seated against said surfaces of said mounting at a predetermined vertical angling of said unit, means for holding said surfaces of said unit and mounting in contact, said means including elements adapted to register only upon respective opposition of said surfaces of said unit and mounting to present a barrier to an aiming of said unit above said vertical angling, an electrical circuit, a socket in spaced relation with said surfaces of said mounting, an incandescent electric lamp having a base and a bulb and an obturator on said bulb, means for causing said lamp to be active as an illuminant, said last means including contact elements respectively on said socket and base adapted to register to close said circuit only upon a sole predetermined positioning of said obturator relative to said mounting, a casing, a closure comprising a lens and rim, said closure and casing adapted to make a close relative approach to assembled position, over said mounting and reflector, only upon said respective opposition of said surfaces of said mounting and reflector and upon a predetermined alignment of said closure with said mounting, and means for holding said closure in assembled position, said last means including elements adapted to supplement said first means to hold said surfaces of said reflector unit and mounting in contact.

27. The structure of claim 10, including a closure for said headlamp and means securing said closure in assembled position, said means including elements adapted to hold said surfaces of said unit in respective contact with said surfaces of said mounting.

28. In an illuminating apparatus, the combination of a fixture, a reflector, a casing and closure comprising a housing having an aperture, a rigid frame-like mounting having a ring portion to position and support said reflector and to detachably support said housing independently of said reflector, a member on said mounting adapted to extend through said aperture for attachment to said fixture, packing means surrounding said aperture, and a bevelled element to compress said packing means to seal said housing.

29. In an illuminating apparatus, the combination of a support, a mounting associated with said support and presenting upper and lower relatively oppositely facing positioning surfaces in rigidly fixed relation to each other, a detachable reflector unit having upper and lower relatively oppositely facing positioning surfaces in rigidly fixed relation to the reflecting surface, said last positioning surfaces being adapted, upon assembling approach of said unit and mounting with a predetermined part of said unit oriented uppermost, to be moved into position causing them respectively to oppose said surfaces of said mounting to bar an aiming of the axis of said reflecting surface above a predetermined normal operating angle of elevation defined by said surfaces of said unit respectively contacting said surfaces of said mounting, and means to prevent said respective contacts of said surfaces and mounting except with said predetermined part oriented uppermost.

30. In an illuminating apparatus, the combination of a reflector having an irregular aperture, a mounting to locate said reflector in operating position, a lamp support, a detachable lamp comprising a source of light and a base having a pair of spaced lugs, part of said base and one of said lugs being adapted to pass through said irregular aperture to afford engagement of said base in said support, said lugs being effective upon partial rotation of said base in said support to contact front and rear surfaces of said reflector to hold the latter in said operating position.

JOSEPH BRADFORD WARDWELL.